United States Patent
Kojima et al.

(10) Patent No.: US 11,833,396 B2
(45) Date of Patent: Dec. 5, 2023

(54) GOLF BALL

(71) Applicant: Sumitomo Rubber Industries, Ltd., Kobe (JP)

(72) Inventors: Daijiro Kojima, Kobe (JP); Takahiro Sajima, Kobe (JP); Hikaru Nagakura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/948,297

(22) Filed: Sep. 20, 2022

(65) Prior Publication Data
US 2023/0089974 A1 Mar. 23, 2023

(30) Foreign Application Priority Data
Sep. 21, 2021 (JP) .................................. 2021-153490

(51) Int. Cl.
*A63B 37/02* (2006.01)
*A63B 37/00* (2006.01)
*C08F 279/02* (2006.01)

(52) U.S. Cl.
CPC ...... *A63B 37/0051* (2013.01); *A63B 37/0031* (2013.01); *A63B 37/0033* (2013.01);
(Continued)

(58) Field of Classification Search
CPC ........................................ A63B 37/0003–0097
See application file for complete search history.

(56) References Cited

U.S. PATENT DOCUMENTS

2002/0098916 A1* 7/2002 Endo .................. A63B 37/0003
473/371
2002/0177492 A1* 11/2002 Watanabe .......... A63B 37/0062
473/371
(Continued)

FOREIGN PATENT DOCUMENTS

JP 63-212377 A 9/1988
JP 2001-149504 A 6/2001
(Continued)

*Primary Examiner* — Eugene L Kim
*Assistant Examiner* — Matthew B Stanczak
(74) *Attorney, Agent, or Firm* — Birch, Stewart, Kolasch & Birch, LLP

(57) ABSTRACT

An object of the present disclosure is to provide a golf ball having excellent durability and flight distance and good shot feeling for an average golfer who hits a golf ball at a slow head speed. The present disclosure provides a golf ball comprising a spherical core and at least two cover layers covering the spherical core, wherein a difference between a core surface crosslinking density and a core center crosslinking density is more than $1.0 \times 10^2$ mol/m$^3$ and less than $9.0 \times 10^2$ mol/m$^3$, a hardness difference between a core surface hardness Cs (Shore C hardness) and a core center hardness Co (Shore C hardness) is 13.0 or more and 30.0 or less, a compression deformation amount of the core when applying a load from an initial load of 98 N to a final load of 1275 N to the core is 3.8 mm or more, and the at least two cover layers include a first cover layer and a second cover layer positioned closer to the spherical core than the first cover layer, an average hardness Dave=(Ti×Hi+To×Ho)/(Ti+To) of the first cover layer and the second cover layer is 55 or more, where To (mm) is a thickness of the first cover layer, Ho (Shore D) is a slab hardness of the first cover layer, Ti (mm) is a thickness of the second cover layer, and Hi (Shore D) is a slab hardness of the second cover layer.

20 Claims, 1 Drawing Sheet

(52) U.S. Cl.
CPC ...... *A63B 37/0063* (2013.01); *A63B 37/0065* (2013.01); *A63B 37/0066* (2013.01); *A63B 37/0075* (2013.01); *A63B 37/00621* (2020.08); *A63B 37/00622* (2020.08); *C08F 279/02* (2013.01)

(56) References Cited

U.S. PATENT DOCUMENTS

| | | | | |
|---|---|---|---|---|
| 2003/0119604 A1* | 6/2003 | Moriyama | ....... | A63B 37/00621 473/371 |
| 2003/0232665 A1* | 12/2003 | Sasaki | ............. | A63B 37/0003 473/378 |
| 2004/0009831 A1* | 1/2004 | Ohama | ............. | A63B 37/0003 473/378 |
| 2004/0058750 A1* | 3/2004 | Iwami | ............. | A63B 37/0003 473/378 |
| 2005/0014577 A1* | 1/2005 | Sasaki | ............. | A63B 37/0092 473/378 |
| 2005/0233834 A1* | 10/2005 | Watanabe | ......... | A63B 37/0092 473/378 |
| 2005/0250599 A1* | 11/2005 | Watanabe | ........ | A63B 37/00622 473/371 |
| 2006/0166761 A1* | 7/2006 | Kim | ................ | A63B 37/0066 473/371 |
| 2006/0178231 A1* | 8/2006 | Kasashima | ........ | A63B 37/0012 473/371 |
| 2008/0220900 A1* | 9/2008 | Komatsu | ............ | A63B 37/06 473/383 |
| 2011/0143861 A1* | 6/2011 | Watanabe | ......... | A63B 37/0065 473/373 |
| 2011/0250987 A1* | 10/2011 | Umezawa | ......... | A63B 37/0077 473/384 |
| 2012/0157235 A1* | 6/2012 | Kimura | ............. | A63B 37/0018 473/378 |
| 2014/0100059 A1* | 4/2014 | Kimura | ............. | A63B 37/0064 473/377 |
| 2015/0065268 A1* | 3/2015 | Nakajima | ......... | A63B 37/0065 473/376 |
| 2015/0087442 A1* | 3/2015 | Ichikawa | ................ | C08K 3/22 473/376 |
| 2016/0184649 A1* | 6/2016 | Matsuyama | ........... | C09D 5/22 473/378 |
| 2016/0184655 A1* | 6/2016 | Yamazaki | ......... | A63B 37/0068 473/374 |
| 2016/0199701 A1* | 7/2016 | Watanabe | ............... | C08K 5/14 473/372 |
| 2017/0173398 A1* | 6/2017 | Tachibana | ......... | A63B 37/0045 |
| 2018/0093139 A1* | 4/2018 | Watanabe | ......... | A63B 37/0051 |
| 2018/0133560 A1* | 5/2018 | Kimura | .................. | C08G 18/10 |
| 2019/0290971 A1* | 9/2019 | Kimura | ............. | A63B 37/0075 |
| 2020/0001142 A1* | 1/2020 | Yamanaka | ....... | A63B 37/00776 |
| 2020/0001143 A1* | 1/2020 | Shindo | ............... | A63B 37/0063 |
| 2020/0306594 A1* | 10/2020 | Kimura | ............. | C08G 18/4063 |
| 2020/0376347 A1* | 12/2020 | Hayashi | ............. | A63B 37/0051 |
| 2021/0002459 A1* | 1/2021 | Hayashi | ............. | A63B 37/0031 |
| 2021/0220705 A1* | 7/2021 | Kimura | ............ | A63B 37/00621 |

FOREIGN PATENT DOCUMENTS

| | | |
|---|---|---|
| JP | 2004-121815 A | 4/2004 |
| JP | 2015-47502 A | 3/2015 |
| JP | 2015-77405 A | 4/2015 |

\* cited by examiner

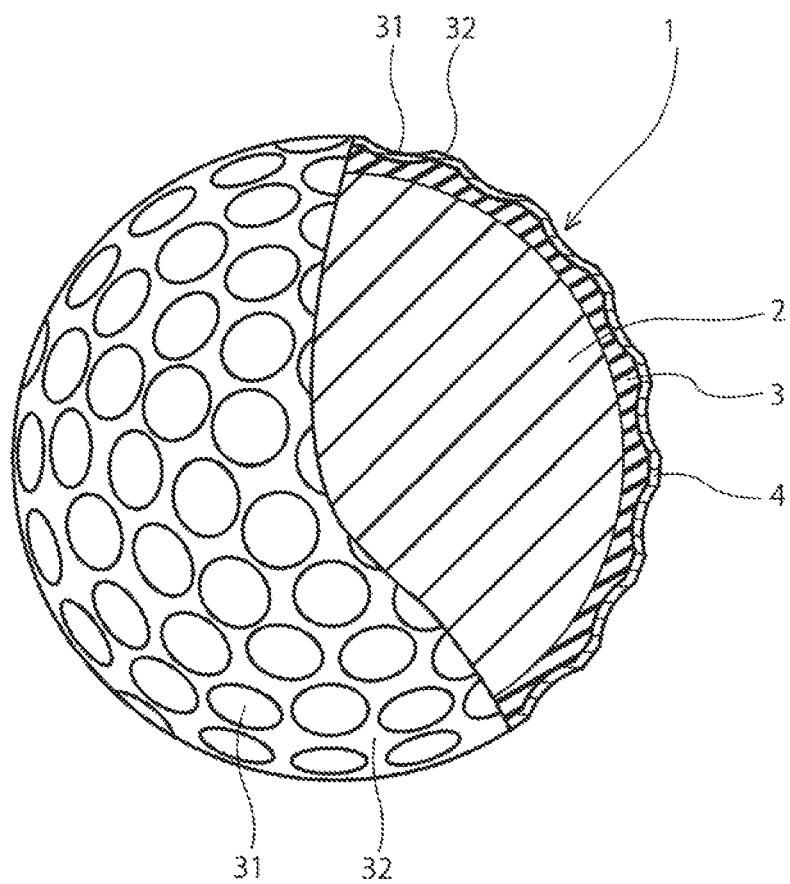

GOLF BALL

FIELD OF THE DISCLOSURE

The present disclosure relates to a golf ball, and more specifically relates to a technology for improving a core and a cover of a golf ball.

DESCRIPTION OF THE RELATED ART

Golf is a sport that can be played by golfers of all ages and genders. Golfers such as beginners, women or seniors hit a golf ball at a slow head speed and thus use a relatively soft golf ball. A hard ball is not compressed when the hard ball is hit by the golfers with a slow head speed, thus good shot feeling is not obtained. In addition, the golfers with a slow head speed do not compress a hard golf ball when hitting the hard golf ball, thus the spin rate increases and the flight distance does not increase.

A golf ball is generally composed of a spherical core and a cover covering the spherical core. As a material for forming a core of a golf ball, a rubber composition containing a base rubber, a co-crosslinking agent and a crosslinking initiator is widely used in light of its good resilience.

For example, JP 2015-077405 A discloses a golf ball comprising a core and a cover composed of at least one layer, wherein letting R (mm) be a radius of the core, A be a JIS-C hardness at a center of the core, B be a JIS-C hardness at a position R/3 mm away from the core center, C be a JIS-C hardness at a position R/1.8 mm away from the core center, D be a JIS-C hardness at a position R/1.3 mm away from the core center, and E be a JIS-C hardness at a surface of the core, the core has a cross-sectional hardness which satisfies formulas (1) to (4) below:

$$D-C \geq 7 \quad (1)$$

$$C-B \leq 7 \quad (2)$$

$$(D-C)-(C-B) \geq 7, \text{ and} \quad (3)$$

$$E-A \geq 16. \quad (4)$$

In addition, JP 2015-047502 A discloses a golf ball comprising a core and a cover composed of one layer or a plurality of layers, wherein the core is formed from a heat-molded product of a rubber composition containing the following components (A) to (C):
(A) a base rubber,
(B) an organic peroxide, and
(C) water and/or a metal monocarboxylate; and
wherein a product (P×E) of a difference P (mol/m³) in a crosslinking density between a surface of the core and a center of the core measured based on a toluene swelling test, multiplied by a deflection E (mm) of the core when applying an initial load of 98N (10 kgf) to a final load of 1275 N (130 kgf) is 28×10² mol/m³·mm or more.

JP 2001-149504 A discloses a one-piece golf ball composed of a ball body formed from a white rubber composition containing a base rubber, an α,β-unsaturated carboxylic acid and/or a metal salt thereof and an organic peroxide, and a clear coat painted on a surface of the ball body, wherein the white rubber composition contains 0.1 to 5.0 parts by mass of an antioxidant and 0.05 to 3.0 parts by mass of a light stabilizer with respect to 100 parts by mass of the base rubber, and the clear coat contains 0.05 to 5.0 parts by mass of an UV absorber with respect to 100 parts by mass of a resin component.

JP 2004-121815 A discloses a golf ball comprising a heat-molded product formed from a rubber composition as a constituent element, wherein the rubber composition contains a polybutadiene including a cis-1,4 bond in an amount of 60 weight % or more and having a Mooney viscosity (ML 1+4 (100° C.)) of 40 or more, an unsaturated carboxylic acid and/or a metal salt thereof, an organic peroxide, and a monophenol-based antioxidant.

JP S63-212377 A discloses a solid golf ball comprising an elastic portion formed from a rubber composition containing a base rubber, an α,β-ethylenically unsaturated carboxylic acid metal salt, an ethylenically unsaturated carboxylic acid ester having a hindered phenol group, and a peroxide as at least one part of the solid golf ball.

SUMMARY OF THE DISCLOSURE

An object of the present disclosure is to provide a golf ball having excellent durability and flight distance and good shot feeling for an average golfer with a slow head speed.

The present disclosure provides a golf ball comprising a spherical core and at least two cover layers covering the spherical core, wherein the spherical core is formed from a core rubber composition containing (a) a base rubber, (b) an α,β-unsaturated carboxylic acid and/or a metal salt thereof as a co-crosslinking agent, and (c) a crosslinking initiator, a difference (core surface crosslinking density−core center crosslinking density) between a surface crosslinking density of the spherical core and a center crosslinking density of the spherical core is more than $1.0 \times 10^2$ mol/m³ and less than $9.0 \times 10^2$ mo/m³, a hardness difference (Cs-Co) between a surface hardness Cs (Shore C hardness) of the spherical core and a center hardness Co (Shore C hardness) of the spherical core is 13.0 or more and 30.0 or less, a compression deformation amount of the spherical core when applying a load from an initial load of 98 N to a final load of 1275 N to the spherical core is 3.8 mm or more, and the at least two cover layers include a first cover layer and a second cover layer positioned closer to the spherical core than the first cover layer, an average hardness Dave=(Ti×Hi+To×Ho)/(Ti+To) of the first cover layer and the second cover layer is 55 or more, where To (mm) is a thickness of the first cover layer, Ho (Shore D) is a slab hardness of the first cover layer, Ti (mm) is a thickness of the second cover layer, and Hi (Shore D) is a slab hardness of the second cover layer.

The golf ball according to the present disclosure has excellent durability and great flight distance and good shot feeling for an average golfer with a slow head speed by having the above configuration.

According to the present disclosure, a golf ball having excellent durability and great flight distance and good shot feeling for an average golfer with a slow head speed is obtained.

BRIEF DESCRIPTION OF THE DRAWINGS

The figure is a partially cutaway cross-sectional view of a golf ball according to one embodiment of the present disclosure.

DESCRIPTION OF THE PREFERRED EMBODIMENT

The present disclosure provides a golf ball comprising a spherical core and at least two cover layers covering the spherical core, wherein the spherical core is formed from a core rubber composition containing (a) a base rubber, (b) an α,β-unsaturated carboxylic acid and/or a metal salt thereof as a co-crosslinking agent, and (c) a crosslinking initiator, a difference (core surface crosslinking density−core center crosslinking density) between a surface crosslinking density of the spherical core and a center crosslinking density of the spherical core is more than $1.0 \times 10^2$ mol/m$^3$ and less than $9.0 \times 10^2$ mol/m$^3$, a hardness difference (Cs-Co) between a surface hardness Cs (Shore C hardness) of the spherical core and a center hardness Co (Shore C hardness) of the spherical core is 13.0 or more and 30.0 or less, a compression deformation amount of the spherical core when applying a load from an initial load of 98 N to a final load of 1275 N to the spherical core is 3.8 mm or more, and the at least two cover layers include a first cover layer and a second cover layer positioned closer to the spherical core than the first cover layer, an average hardness Dave=(Ti×Hi+To×Ho)/(Ti+To) of the first cover layer and the second cover layer is 55 or more, where To (mm) is a thickness of the first cover layer, Ho (Shore D) is a slab hardness of the first cover layer, Ti (mm) is a thickness of the second cover layer, and Hi (Shore D) is a slab hardness of the second cover layer.

The spherical core of the golf ball according to the present disclosure is formed from a core rubber composition containing (a) a base rubber, (b) an α,β-unsaturated carboxylic acid and/or a metal salt thereof as a co-crosslinking agent, and (c) a crosslinking initiator. First, materials used for the spherical core of the golf ball according to the present disclosure will be explained.

[(a) Base Rubber]

As (a) the base rubber, a natural rubber and/or a synthetic rubber is used. For example, a polybutadiene rubber, a natural rubber, a polyisoprene rubber, a styrene polybutadiene rubber, or an ethylene-propylene-diene rubber (EPDM) can be used. These rubbers may be used solely, or at least two of these rubbers may be used in combination. Among them, particularly preferred is a high-cis polybutadiene having a cis-1,4 bond in an amount of 40 mass % or more, preferably 80 mass % or more, more preferably 90 mass % or more, and even more preferably 95 mass % or more in view of their superior resilience.

From the viewpoint of obtaining a core having higher resilience, the amount of the high-cis polybutadiene in the base rubber is preferably 60 mass % or more, more preferably 80 mass % or more, and even more preferably 90 mass % or more. It is also preferable that (a) the base rubber consists of the high-cis polybutadiene.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene preferably includes a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity (ML$_{1+4}$ (100° C.)) of 30 or more, more preferably 32 or more, even more preferably 35 or more, and preferably has a Mooney viscosity (ML$_{1+4}$ (100° C.)) of 140 or less, more preferably 120 or less, even more preferably 100 or less, and most preferably 55 or less. It is noted that the Mooney viscosity (ML$_{1+4}$ (100° C.)) in the present disclosure is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and the molecular weight distribution is calculated by converting based on polystyrene standard.

[(b) Co-Crosslinking Agent]

(b) The α,β-unsaturated carboxylic acid having 3 to 8 carbon atoms and/or the metal salt thereof used for the rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid and crotonic acid.

Examples of the metal ion constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the α,β-unsaturated carboxylic acid having 3 to 8 carbon atoms is used, a metal crosslinking easily generates between the rubber molecules. Especially, as the divalent metal salt, zinc acrylate is preferable, because use of zinc acrylate enhances the resilience of the obtained golf ball. It is noted that the α,β-unsaturated carboxylic acid having 3 to 8 carbon atoms and/or the metal salt thereof may be used solely or as a mixture of at least two of them.

The amount of (b) the α,β-unsaturated carboxylic acid having 3 to 8 carbon atoms and/or the metal salt thereof is preferably 20 parts by mass or more, more preferably 25 parts by mass or more, and even more preferably 30 parts by mass or more, and is preferably 55 parts by mass or less, more preferably 50 parts by mass or less, and even more preferably 45 parts by mass or less, with respect to 100 parts by mass of (a) the base rubber. If the amount of (b) the α,β-unsaturated carboxylic acid having 3 to 8 carbon atoms and/or the metal salt thereof is less than 20 parts by mass, the amount of (c) the crosslinking initiator which will be described later must be increased such that the cured product (e.g. core) formed from the rubber composition has an appropriate hardness, which tends to lower the resilience of the obtained golf ball. On the other hand, if the amount of the α,β-unsaturated carboxylic acid having 3 to 8 carbon atoms and/or the metal salt thereof is more than 55 parts by mass, the cured product (e.g. core) formed from the rubber composition becomes so hard that the shot feeling of the obtained golf ball may be lowered.

[(c) Crosslinking Initiator]

(c) The crosslinking initiator used for the rubber composition is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy) hexane and di-t-butyl peroxide. These organic peroxides may be used solely or as a mixture of at least two of them. Among them, dicumyl peroxide is preferably used.

In case that the rubber composition contains at least one type of the following components (d), the amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the cured product (e.g. core) formed from the rubber composition is so soft that the resilience of the obtained golf ball tends to be lowered, and if the amount of the crosslinking initiator is more than 5.0 parts by mass, the amount of (b) the co-crosslinking agent described above must be decreased such that the cured product (e.g. core) formed from the rubber composition has an appropriate hardness, which tends to lower the resilience or worsen the durability of the obtained golf ball.

In case that the rubber composition does not contain the following components (d), the amount of (c) the crosslinking initiator is preferably 0.1 part by mass or less with respect to 100 parts by mass of (a) the base rubber. If the amount of (c) the crosslinking initiator is 0.1 part by mass or less with respect to 100 parts by mass of (a) the base rubber, the crosslinking density is decreased for the amount of the co-crosslinking agent, the breaking strain is increased, and the durability is enhanced.

The core rubber composition preferably contains at least one (d) additive selected from the group consisting of (d1) a hindered phenol-based compound and (d2) a hindered amine-based compound. The component (d) lowers the crosslinking density difference of the core while keeping the hardness difference of the core to an extent which is not lower than a predetermined level.

[(d1) Hindered Phenol-Based Compound]

The hindered phenol-based compound is a compound having a hydroxyphenyl structure with a hydroxy group thereof being sterically protected by a bulky functional group. The bulky functional group preferably exists at a position adjacent to the hydroxy group. Examples of the bulky functional group include t-butyl group, and a long chain alkyl group optionally having a part of the carbon atoms thereof replaced with a sulfur atom. As the hindered phenol-based compound, a compound having a tert-butylhydroxyphenyl structure with at least one tert-butyl group is preferable, a compound having a di-tert-butylhydroxyphenyl structure with two tert-butyl groups is more preferable.

Examples of the compound having the tert-butylhydroxyphenyl structure with at least one tert-butyl group include compounds having a structure such as 3-tert-butyl-4-hydroxyphenyl or 3,5-di-tert-butyl-4-hydroxyphenyl. Among them, the compound having 3,5-di-tert-butyl-4-hydroxyphenyl structure is preferable.

Specific examples of the hindered phenol-based compound include a compound having one hydroxyphenyl structure, such as dibutylhydroxy toluene (BHT), 4,6-bis(octylthiomethyl)-o-cresol, 4,6-bis[(dodecylthio)methyl]-o-cresol, 2,4-dimethyl-6-(1-methylpentadecyl) phenol (e.g. Irganox 1141 available from BASF Japan Ltd.), and octadecyl-3-(3,5-di-t-butyl-4-hydroxyphenyl) propionate (e.g. ADK STAB AO-50 available from Adeka Corporation).

Other specific examples of the hindered phenol-based compound include a compound having two hydroxyphenyl structures, such as 2,2'-methylene bis(4-ethyl-6-tert-butylphenol) (e.g. YOSHINOX 425 available from Mitsubishi Chemical Corporation), 2,2'-methylene bis(4-methyl-6-tert-butylphenol) (e.g. Sandant 2246 available from Sanshin Chemical Industry Co., Ltd.), 4,4'-butylidene bis(3-methyl-6-tert-butylphenol) (e.g. YOSHINOX BB available from Mitsubishi Chemical Corporation), 4,4'-thiobis(3-methyl-6-tert-butylphenol) (e.g. NOCRAC 300 available from Ouchi Shinko Chemical Industrial Co., Ltd.), 4,4-methylene bis(2, 6-di-tert-butylphenol), 2,6-di-tert-butyl-4-({2-[(3,5-di-tert-butyl-4-hydroxyphenyl) sulfanyl]propane-2-yl} sulfanyl) phenol (probucol), and 3,9-bis[2-[3-(3-tert-butyl-4-hydroxy-5-methylphenyl) propionyloxy]-1,1-dimethylethyl]-2,4,8,10-tetraoxaspiro[5.5] undecane (e.g. ADK STAB AO-80 available from Adeka Corporation).

Other specific examples of the hindered phenol-based compound include a compound having three hydroxyphenyl structures, such as 1,3,5-tris-(3,5-di-tert-butyl-4-hydroxybenzyl)-1,3-5-triazine-2,4,6(1H,3H,5H-)-trione (e.g. ADK STAB AO-20 available from Adeka Corporation), and 1,3, 5-trimethyl-2,4,6-tris(3,5-di-t-butyl-4-hydroxybenzyl) benzene (e.g. ADK STAB AO330 available from Adeka Corporation).

Other specific examples of the hindered phenol-based compound include a compound having four hydroxyphenyl structures, such as pentaerythritol tetrakis[3-(3,5-di-tert-butyl-4-hydroxyphenyl) propionate] (e.g. ADK STAB AO-60 available from Adeka Corporation).

The hindered phenol-based compound may be used solely, or two or more of them may be used in combination.

As the hindered phenol-based compound, at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl) sulfanyl] propane-2-yl} sulfanyl) phenol, 1,3,5-tris(3,5-di-tert-butyl-4-hydroxybenzyl)-1,3,5-triazine-2,4,6-(1H,3H, 5H)-trione, and pentaerythritol tetrakis[3-(3,5-di-tert-butyl-4-hydroxyphenyl) propionate is preferable.

As (d2) the hindered amine-based compound, a compound having 2,2,6,6-tetramethyl-4-piperdyl group represented by the following chemical formula (1) is preferable.

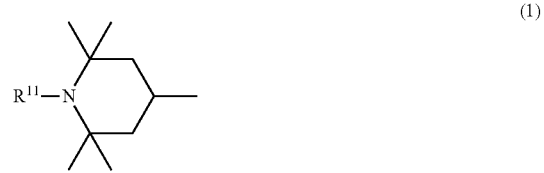

(1)

In the formula (1), $R^{11}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

The hindered amine-based compound represented by the chemical formula (1) includes the hindered amine-based compound as represented by the chemical formula (2) or chemical formula (3).

The hindered amine-based compound represented by the following chemical formula (2) is a so-called N-alkyl type hindered amine-based compound or NH type hindered amine-based compound.

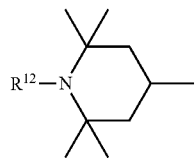
(2)

In the formula (2), $R^{12}$ is a hydrogen atom, a hydroxy group, an alkyl group having 1 to 30 carbon atoms, a hydroxyalkyl group having 1 to 30 carbon atoms, or an oxyradical.

The hindered amine-based compound represented by the following chemical formula (3) is a so-called N-alkoxy type hindered amine compound.

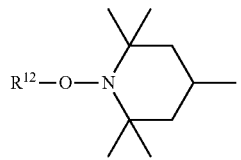
(3)

In the chemical formula (3), $R^{12}$ is an alkyl group having 1 to 30 carbon atoms or a hydroxyalkyl group having 1 to 30 carbon atoms.

Specific examples of (d2) the hindered amine-based compound include compounds represented by the chemical formulae (4) to (6).

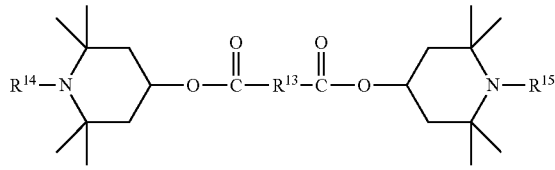
(4)

In the chemical formula (4), $R^{14}$ and $R^{15}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical. $R^{13}$ is an alkylene group having 1 to 20 carbon atoms.

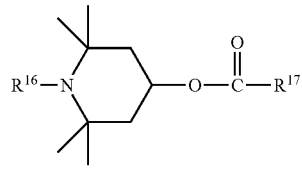
(5)

In the chemical formula (5), $R^{16}$ is a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical. $R^{17}$ is an alkyl group having 1 to 30 carbon atoms, or an alkenyl group having 2 to 30 carbon atoms.

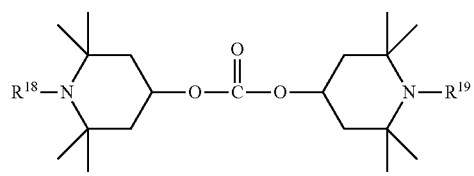
(6)

In the chemical formula (6), $R^{18}$ and $R^{19}$ are each independently a hydrogen atom, a hydroxy group, an alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxyradical.

Specific examples of (d2) the hindered amine-based compound include ADK STAB LA-52 (tetrakis(1,2,2,6,6-pentamethyl-4-piperidyl) butane-1,2,3,4-tetracarboxylate), ADK STAB LA-57 (tetrakis(2,2,6,6-tetramethyl-4-piperidyl) butane-1,2,3,4-tetracarboxylate), ADK STAB LA-63P, ADK STAB LA-68, ADK STAB LA-72 (bis(1,2,2,6,6-pentamethyl-4-piperidyl) sebacate, ADK STAB LA-77Y (bis(2,2,6,6-tetramethyl-4-piperidyl) sebacate, and ADK STAB LA-81 (bis(1-undecanoxy-2,2,6,6-tetramethylpiperdine-4-yl) carbonate available from Adeka Corporation.

Specific examples of (d2) the hindered amine-based compound include the following products available from BASF Japan Ltd.

1) Chimassorb 2020FDL
1,6-Hexanediamine, N,N'-bis(2,2,6,6-tetramethyl-4-piperdinyl)-polymer with 2,4,6-trichloro-1,3,5-triazine, reaction products with N-butyl-1-butanamine and N-butyl-2,2,6,6-tetramethyl-4-piperdinamine 2) Chimassorb 944FDL
Poly[[6-[(1,1,3,3-tetramethylbutyl) amino]-1,3,5-triazine-2,4-diyl][(2,2,6,6-tetramethyl-4-piperidinyl) imino]-1,6-hexanediyl[(2,2,6,6-tetramethyl-4-piperidinyl) imino]])

3) TINUVIN 622SF
Butanedioic acid, dimethylester, polymer with 4-hydroxy-2,2,6,6-tetramethyl-1-piperidine ethanol)

4) TINUVIN PA144
Bis(1,2,2,6,6-pentamethyl-4-piperdinyl)-2-butyl-2-(4-hydroxy-3,5-di-tert-butylbenzyl) propanedioate (d2) The hindered amine-based compound may be used solely, or two or more of them may be used in combination. In addition, (d1) the hindered phenol-based compound and (d2) the hindered amine-based compound may be used in combination.

In case that the core rubber composition contains (d1) the hindered phenol-based compound and/or (d2) the hindered amine-based compound as (d) the additive, the amount of (d1) the hindered phenol-based compound and/or (d2) the hindered amine-based compound is preferably 0.5 part by mass or more, more preferably 1 part by mass or more, and even more preferably 1.5 parts by mass or more, and is preferably 15 parts by mass or less, more preferably 13 parts by mass or less, and even more preferably 11 parts by mass or less, with respect to 100 parts by mass of (a) the base rubber. If the amount of (d1) the hindered phenol-based compound and/or (d2) the hindered amine-based compound falls within the above range, the crosslinking density is low for the amount of the co-crosslinking agent, the strain at break is increased, and the durability is enhanced.

[(e) Organic Sulfur Compound]

The core rubber composition preferably further contains (e) an organic sulfur compound. If (e) the organic sulfur compound is contained, the obtained core has further enhanced resilience.

As (e) the organic sulfur compound, at least one compound selected from the group consisting of thiols (thiophenols or thionaphthols), polysulfides, thiurams, thiocarboxylic acids, dithiocarboxylic acids, sulfenamides, dithiocarbamates, and thiazoles is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable. Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide.

Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (e) the organic sulfur compound, the thiophenols and/or the metal salts thereof, the thionaphthols and/or the metal salts thereof, the diphenyl disulfides, and the thiuram disulfides are preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

(e) The organic sulfur compound may be used solely, or two or more of them may be used in combination.

The amount of (e) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and the resilience of the golf ball may not be enhanced. In addition, if the amount of (e) the organic sulfur compound is more than 5.0 parts by mass, the obtained golf ball has a great compression deformation amount and thus the resilience thereof may be lowered.

[(f) Metal Compound]

The core rubber composition preferably further contains (f) a metal compound. (f) The metal compound can be used as, for example, a weight adjusting agent for the core rubber composition, or a neutralizing agent for the α,β-unsaturated carboxylic acid having 3 to 8 carbon atoms.

Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (f) the metal compound, the divalent metal compound is preferable, the zinc compound is more preferable. This is because the divalent metal compound reacts with the α,β-unsaturated carboxylic acid having 3 to 8 carbon atoms to form a metal crosslinking. In addition, if the zinc compound is used, the obtained golf ball has better resilience.

(f) The metal compound may be used solely, or at least two of them may be used in combination. In addition, the amount of (f) the metal compound may be appropriately adjusted according to the desired neutralization degree of (b) the α, β-unsaturated carboxylic acid having 3 to 8 carbon atoms.

The core rubber composition may further contain an additive such as a pigment, a filler for adjusting weight or the like, a peptizing agent, and a softener, where necessary.

The filler blended in the core rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder. As the filler, zinc oxide is particularly preferable. It is considered that zinc oxide acts as a vulcanizing aid to increase the hardness of the core as a whole. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of (a) the base rubber. If the amount of the filler is less than 0.5 part by mass, it is difficult to adjust the weight, and if the amount of the filler is more than 30 parts by mass, the weight proportion of the rubber component is decreased and thus the resilience tends to be lowered.

The amount of the peptizing agent is preferably 0.1 part by mass or more and 5 parts by mass or less with respect to 100 parts by mass of (a) the base rubber.

The golf ball according to the present disclosure comprises a spherical core and at least two cover layers covering the spherical core, wherein the spherical core is formed from the above core rubber composition.

In the spherical core of the golf ball according to the present disclosure, the difference (core surface crosslinking density−core center crosslinking density) between the surface crosslinking density of the spherical core and the center crosslinking density of the spherical core is more than $1.0 \times 10^2$ mol/m$^3$ and less than $9.0 \times 10^2$ mol/m$^3$, and the hardness difference (Cs-Co) between the surface hardness Cs (Shore C hardness) of the spherical core and the center hardness Co (Shore C hardness) of the spherical core is 13.0 or more and 30.0 or less.

The golf ball according to the present disclosure is characterized in that the crosslinking density difference between the core surface and the core center is not higher than a predetermined value while the hardness difference between the core surface and the core center is not lower than a predetermined value. The golf ball having this core has excellent durability and has good shot feeling at the same time.

In the spherical core of the golf ball according to the present disclosure, the difference (core surface crosslinking density−core center crosslinking density) between the surface crosslinking density of the spherical core and the center crosslinking density of the spherical core is preferably more than $1.0 \times 10^2$ mol/m$^3$, more preferably $1.5 \times 10^2$ mol/m$^3$ or more, and even more preferably $2.0 \times 10^2$ mol/m$^3$ or more, and is preferably less than $9.0 \times 10^2$ mol/m$^3$, more preferably $8.9 \times 10^2$ mol/m$^3$ or less, and even more preferably $8.8 \times 10^2$ mol/m$^3$ or less. If the difference (core surface crosslinking density−core center crosslinking density) between the surface crosslinking density of the spherical core and the center crosslinking density of the spherical core falls within the above range, good feeling is obtained while the durability is maintained.

The surface crosslinking density of the spherical core is preferably $9.0 \times 10^2$ mol/m$^3$ or more, more preferably $9.5 \times 10^2$ mol/m$^3$ or more, and even more preferably $10.0 \times 10^2$ mol/m$^3$ or more, and is preferably $22.0 \times 10^2$ mol/m$^3$ or less, more preferably $21.0 \times 10^2$ mol/m$^3$ or less, and even more preferably $20.0 \times 10^2$ mol/m$^3$ or less. If the surface crosslinking density of the spherical core falls within the above range, the rubber composition is not excessively hard, and good feeling is obtained.

The center crosslinking density of the spherical core is preferably $4.0 \times 10^2$ mol/m$^3$ or more, more preferably $4.5 \times 10^2$ mol/m$^3$ or more, and even more preferably $5.0 \times 10^2$ mol/m$^3$ or more, and is preferably $13.0 \times 10^2$ mol/m$^3$ or less, more preferably $12.0 \times 10^2$ mol/m$^3$ or less, and even more preferably $11.0 \times 10^2$ mol/m$^3$ or less. If the center crosslinking density of the spherical core falls within the above range, the rubber composition is not excessively soft, and the resilience can be maintained.

The hardness difference (Cs-Co) between the surface hardness (Cs) and the center hardness (Co) of the spherical core is preferably 13.0 or more, more preferably 14.0 or more, and even more preferably 15.0 or more, and is preferably 30.0 or less, more preferably 28.0 or less, and even more preferably 26.0 or less in Shore C hardness. If the hardness difference (Cs-Co) between the surface hardness (Cs) and the center hardness (Co) of the spherical core is 13.0 or more in Shore C hardness, the durability is maintained or enhanced. In addition, if the hardness difference (Cs-Co) between the surface hardness (Cs) and the center hardness (Co) of the spherical core is 30.0 or less in Shore C hardness, the golf ball having further enhanced shot feeling on driver shots is obtained.

The surface hardness (Cs) of the spherical core is preferably 60.0 or more, more preferably 65.0 or more, and even more preferably 70.0 or more, and is preferably 90.0 or less, more preferably 88.0 or less, and even more preferably 85.0 or less in Shore C hardness. If the surface hardness (Cs) of the spherical core is 60.0 or more in Shore C hardness, the core has better resilience. In addition, the surface hardness (Cs) of the spherical core is 90.0 or less in Shore C hardness, the shot feeling on driver shots is further enhanced.

The center hardness (Co) of the spherical core is preferably 30.0 or more, more preferably 35.0 or more, and even more preferably 40.0 or more in Shore C hardness. If the center hardness (Co) of the spherical core is 30.0 or more in Shore C hardness, the spherical core is not excessively soft, and the resilience is better. In addition, the center hardness (Co) of the spherical core is preferably 70.0 or less, more preferably 68.0 or less, and even more preferably 67.0 or less in Shore C hardness. If the center hardness (Co) is 70.0 or less in Shore C hardness, the core is not excessively hard, and the shot feeling is better.

The diameter of the spherical core of the golf ball according to the present disclosure is preferably 34.8 mm or more, more preferably 35.8 mm or more, and even more preferably 36.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the resilience is better. On the other hand, if the diameter of the spherical core is 42.2 mm or less, the cover is not excessively thin, and thus the cover functions better.

When the spherical core has the diameter in the range from 34.8 mm to 42.2 mm, the compression deformation amount (shrinking amount along the compression direction) of the spherical core when applying a load from 98 N as an initial load to 1275 N as a final load to the spherical core is preferably 3.8 mm or more, more preferably 3.9 mm or more, and even more preferably 4.0 mm or more, and is preferably 6.0 mm or less, more preferably 5.5 mm or less, and even more preferably 5.0 mm or less. If the compression deformation amount is 3.8 mm or more, the shot feeling is better, and if the compression deformation amount is 6.0 mm or less, the resilience is better.

The spherical core of the golf ball according to the present disclosure is obtained by mixing and kneading the above core rubber composition and molding the kneaded core rubber composition in a mold. The molding conditions are not particularly limited, but the molding is generally carried out at a temperature ranging from 130° C. to 200° C. under a pressure ranging from 2.9 MPa to 11.8 MPa for 10 minutes to 60 minutes. For example, it is preferable that the heat pressing of the core rubber composition is preferably carried out at a temperature of 130° C. to 200° C. for 10 to 60 minutes, or carried out in a two-step heating of heating at a temperature of 130° C. to 150° C. for 20 to 40 minutes followed by heating at a temperature of 160° C. to 180° C. for 5 to 15 minutes.

[Cover]

The golf ball according to the present disclosure comprises a spherical core and at least two cover layers covering the spherical core. The at least two cover layers include a first cover layer and a second cover layer positioned closer to the core than the first cover layer, an average hardness Dave=(Ti×Hi+To×Ho)/(Ti+To) of the first cover layer and the second cover layer is 55 or more, where To (mm) is a thickness of the first cover layer, Ho (Shore D) is a slab hardness of the first cover layer, Ti (mm) is a thickness of the second cover layer, and Hi (Shore D) is a slab hardness of the second cover layer.

The average hardness Dave of the first cover layer and the second cover layer is preferably 56 or more, more preferably 57 or more. If the average hardness Dave is 55 or more, a good balance is stricken between a high initial speed and a low spin rate on driver shots. The average hardness Dave of the first cover layer and the second cover layer is preferably 71 or less, more preferably 70 or less, and even more preferably 69 or less. If the average hardness Dave is 71 or less, the shot feeling and the durability are better.

The second cover layer is not particularly limited, as long as the second cover layer is positioned closer to the core than the first cover layer. For example, it is preferable that the first cover layer is an outermost cover layer, and the second cover layer is an inner cover layer adjacent to the outermost cover layer.

The slab hardness Hi of the second cover layer is preferably higher than the slab hardness Ho of the first cover layer. The slab hardness difference (Hi-Ho) between the second cover layer and the first cover layer is preferably 2 or more, more preferably 4 or more, and even more preferably 6 or more, and is preferably 30 or less, more preferably 28 or less, and even more preferably 26 or less.

The slab hardness Ho (Shore D) of the first cover layer is preferably 32 or more, more preferably 33 or more, and even more preferably 34 or more, and is preferably 72 or less, more preferably 71 or less, and even more preferably 70 or less.

The thickness To of the first cover layer is preferably 0.3 mm or more, more preferably 0.4 mm or more, and even more preferably 0.5 mm or more, and is preferably 2.7 mm or less, more preferably 2.6 mm or less, and even more preferably 2.5 mm or less.

The slab hardness Hi (Shore D) of the second cover layer is preferably 32 or more, more preferably 33 or more, and even more preferably 34 or more, and is preferably 72 or less, more preferably 71 or less, and even more preferably 70 or less.

The thickness Ti of the second cover layer is preferably 0.3 mm or more, more preferably 0.4 mm or more, and even more preferably 0.5 mm or more, and is preferably 2.7 mm or less, more preferably 2.6 mm or less, and even more preferably 2.5 mm or less.

The total thickness of the cover is preferably 3.0 mm or less, more preferably 2.9 mm or less, and even more preferably 2.8 mm or less. If the total thickness of the cover is 3.0 mm or less, the obtained golf ball has better resilience and shot feeling. The total thickness of the cover is preferably 1 mm or more, more preferably 1.1 mm or more, and even more preferably 1.2 mm or more. If the total thickness of the cover is less than 1 mm, the durability or wear resistance of the cover may be lowered.

The cover of the golf ball according to the present disclosure is formed from a cover composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered 99) trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "TEFABLOC (registered trademark)" available from Mitsubishi Chemical Corporation.

Examples of the ionomer resin include a product prepared by neutralizing at least a part of carboxyl groups in a binary copolymer composed of an olefin and an $\alpha,\beta$-unsaturated carboxylic acid having 3 to 8 carbon atoms with a metal ion, a product prepared by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion, and a mixture thereof. The olefin is preferably an olefin having 2 to 8 carbon atoms. Examples of the olefin include ethylene, propylene, butene, pentene, hexene, heptene, and octene. In particular, ethylene is preferable. Examples of the $\alpha,\beta$-unsaturated carboxylic acid having 3 to 8 carbon atoms include acrylic acid, methacrylic acid, fumaric acid, maleic acid and crotonic acid. In particular, acrylic acid and methacrylic acid are preferable. Examples of the $\alpha,\beta$-unsaturated carboxylic acid ester include a methyl ester, an ethyl ester, a propyl ester, a n-butyl ester, an isobutyl ester of acrylic acid, methacrylic acid, fumaric acid, and maleic acid. In particular, acrylic acid ester and methacrylic acid ester are preferable. Among these, the ionomer resin preferably includes a metal ion-neutralized product of a binary copolymer composed of ethylene and (meth)acrylic acid, and/or a metal ion-neutralized product of a ternary copolymer composed of ethylene, (meth)acrylic acid and (meth)acrylic acid ester.

The cover composition for forming the cover of the golf ball according to the present disclosure preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

In addition to the resin component, the cover composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener, as long as they do not impair the performance of the cover.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is more than 10 parts by mass, the durability of the resultant cover may deteriorate.

Examples of the method of molding the cover of the golf ball according to the present disclosure include a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding); and a method which comprises injection molding the cover composition directly onto the core.

When molding the cover in a compression molding method, molding of the half shell is performed by either the compression molding method or the injection molding method, and the compression molding method is preferred. Compression molding the cover composition into a half shell is carried out, for example, under a pressure of 1 MPa or more and 20 MPa or less at a temperature of −20° C. or more and 70° C. or less relative to the flow beginning temperature of the cover composition. By performing the molding under the above conditions, the half shell having a uniform thickness is formed. Examples of the method for molding the cover by using the half shell include a method which comprises covering the core with two of the half shells and then performing compression molding. Compression molding half shells into the cover is carried out, for example, under a pressure of 0.5 MPa or more and 25 MPa or less at a temperature of −20° C. or more and 70° C. or less relative to the flow beginning temperature of the cover composition. By performing the molding under the above conditions, the golf ball cover having a uniform thickness is formed.

In case of injection molding the cover composition into the cover, the cover composition extruded in a pellet form may be used for injection molding, or the cover materials such as the base resin components and the pigment may be dry blended, followed by directly injection molding the blended materials. It is preferred to use upper and lower molds having a hemispherical cavity and pimples for forming the cover, wherein a part of the pimples also serves as a retractable hold pin. When molding the cover by injection molding, the hold pin is protruded to hold the core, the cover composition is charged and then cooled to form the cover. For example, the cover composition heated at a temperature ranging from 200° C. to 250° C. is charged into a mold held under a pressure of 9 MPa to 15 MPa for 0.5 to 5 seconds, and after cooling for 10 to 60 seconds, the mold is opened to form the cover.

Concave portions called "dimples" are usually formed on the surface of the cover when the cover is molded. The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimples is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 µm or more, more preferably 7 µm or more, and is preferably 50 µm or less, more preferably 40 µm or less, and even more preferably 30 µm or less. If the thickness of the paint film is less than 5 µm, the paint film is easy to wear off due to the continued use of the golf ball, and if the thickness of the paint film exceeds 50 µm, the dimple effect is reduced and thus the flight performance of the golf ball may be lowered.

[Golf Ball]

The construction of the golf ball according to the present disclosure is not particularly limited, as long as the golf ball comprises a spherical core and at least two cover layers covering the spherical core. The figure is a partially cutaway cross-sectional view of a golf ball 1 according to one embodiment of the present disclosure. The golf ball 1 comprises a spherical core 2, and a second cover layer 3 and a first cover layer 4 covering the spherical core 2. The second cover layer 3 is disposed closer to the core than the first cover layer. The first cover layer 4 is an outermost cover layer. The second cover layer 3 is an inner cover layer adjacent to the outermost cover layer. A plurality of dimples 31 are formed on the surface of the cover. Other portions than the dimples 31 on the surface of the golf ball 1 are lands 32. The golf ball 1 is provided with a paint layer and a mark layer on an outer side of the first cover layer 4, but these layers are not depicted.

The spherical core may have a single layered or multiple layered construction, and preferably have the single layered construction. Unlike the multiple layered spherical core, the single layered spherical core does not have an energy loss at the interface of the multiple layered spherical core when being hit, and thus has better resilience. In addition, the cover has a multiple layered construction composed of at least two layers. Examples of the golf ball according to the present disclosure include a three-piece golf ball composed of a spherical core, an inner cover layer disposed around the spherical core, and an outermost cover layer covering the inner cover layer; and a multi-piece golf ball composed of a spherical core, and at least three cover layers disposed around the spherical core. The present disclosure is suitably applied to any one of the above golf balls.

The golf ball according to the present disclosure preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball according to the present disclosure preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball according to the present disclosure has a diameter in a range of from 40 mm to 45 mm, the compression deformation amount (shrinking amount along the compression direction) of the golf ball when applying a load from an initial load of 98 N to a final load of 1275 N to the golf ball is preferably 2.8 mm or more, more preferably 3.0 mm or more, and even more preferably 3.2 mm or more, and is preferably 4.5 mm or less, more preferably 4.3 mm or less, and even more preferably 4.1 mm or less. If the compression deformation amount is 2.8 mm or more, the golf ball does not become excessively hard, and thus the shot feeling is better. On the other hand, if the compression deformation amount is 4.5 mm or less, the resilience is better.

EXAMPLES

Next, the present disclosure will be described in detail by way of examples. However, the present disclosure is not limited to the examples described below. Various changes and modifications without departing from the spirit of the present disclosure are included in the scope of the present disclosure.

[Evaluation Method]

(1) Crosslinking Density (Mol/m³)

A circular slab having a thickness of 2 mm was cut out of the core in a manner that the circular slab passed through the geometry center of the core. Then, samples having φ 3 mm were cut out of the above circular slab at the core center point and at a measuring point within 4 mm inside from each part corresponding to the core surface, and the weight of the sample was measured with an electronic balance which is measurable to two decimal places (mg). The above sample and 8 ml of toluene were added in a vial having a volume of 10 ml, and the vial was sealed with a plug, and allowed to stand for at least 72 hours. Then, the solution was discarded, and the weight of the sample after the immersion was measured. The crosslinking density of the rubber composition was calculated based on the weights of the sample before and after the swelling, using the following Flory-Rehner formula.

$$v = -(\ln(1-v_r) + v_r + \chi v_r^2)/Vs(v_r^{1/3} - v_r/2)$$

[v: crosslinking density, $v_r$: volume proportion of rubber in swelling, $\chi$: interaction constant, Vs: molar volume of toluene]

$$v_r = V_{BR}/(V_{BR} + V_T)$$

$$V_{BR} = (w_f - w_f v_f)/\rho$$

$$V_T = (w_s - w_f)/\rho_T$$

[$V_{BR}$: volume of BR (butadiene rubber) in rubber composition, $V_T$: volume of swollen toluene, $v_f$: weight proportion of filler in rubber composition, ρ: density of rubber composition, $w_f$: weight of sample before immersion, $w_s$: weight of sample after immersion, $\rho_T$: density of toluene]

It is noted that in the calculation, Vs is $0.1063 \times 10^{-3}$ m³/mol, $\rho_T$ is 0.8669, and $\chi$ is 0.47 according to the literature of Macromolecules 2007, 40, 3669-3675.

(2) Compression Deformation Amount (mm)

The deformation amount along the compression direction of the core or golf ball (shrinking amount along the compression direction of the core or golf ball), when applying a load from an initial load of 98 N to a final load of 1275 N to the core or golf ball, was measured.

(3) Core Hardness (Shore C Hardness)

An automatic hardness tester Digitest II available from Bareiss company was used to measure the hardness of the core. The Shore C hardness measured on the surface of the core was adopted as the surface hardness of the core. In addition, the core was cut into two equal hemispheres to obtain a cut plane, and the hardness at the central point of the cut plane was measured.

(4) Slab Hardness

Sheets with a thickness of about 2 mm were produced by injection molding the cover composition. The sheets were stored at a temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(5) Durability

A W #1 driver provided with a metal head (XXIO PRIME made in 2021, shaft hardness: R, loft angle: 10.5°, available from Sumitomo Rubber Industries, Ltd.) was attached to a swing robot M/C available from Golf Laboratories, Inc. The golf ball was hit repeatedly until a crack occurred, and the hitting times when the crack occurred were counted. The head speed hitting the golf ball was set to 35 m/sec for an average golfer. It is noted that the measurement was conducted using twelve samples for each golf ball, and the average value thereof was adopted as the hitting times of that golf ball. It is noted that the hitting times of the golf ball No. 16 were defined as 100, and the durability of each golf ball was represented by converting the hitting times of each golf ball into this index and evaluated according to the following standard.

E (Excellent): 115 or more
G (Good): 105 or more and less than 115
F (Fair): 95 or more and less than 105
P (Poor): less than 95

(6) Flight Distance

A W #1 driver provided with a metal head (XXIO PRIME made in 2021, shaft hardness: R, loft angle: 10.5°, available from Sumitomo Rubber Industries, Ltd.) was attached to a swing robot M/C available from Golf Laboratories, Inc. The golf ball was hit and the total flight distance thereof was measured. The head speed hitting the golf ball was set to 35 m/sec for an average golfer.

E (Excellent): 171.5 m or more
G (Good): 170 m or more and less than 171.5 m
F (Fair): 168 m or more and less than 170 m
P (Poor): less than 168 m (7) Shot Feeling An actual hitting test was carried out by twenty average golfers using a driver. In accordance with the number of people who answered the shot feeling was soft, the golf balls were evaluated as follows.

Evaluation Standard
- E (Excellent): 16 or more
- G (Good): 10 or more and 15 or less
- F (Fair): 3 or more and 9 or less
- P (Poor): 2 or less (8) Comprehensive Evaluation A comprehensive evaluation regarding the durability, shot feeling and flight distance was done based on the following standard. It is noted that the comprehensive evaluation B is an acceptable range.

A: The evaluation results of durability, shot feeling and flight distance are only G (good) or E (excellent).

B: One of the evaluation results of durability, shot feeling and flight distance is F (fair).

C: There is P (poor) or at least two F (fair) in the evaluation results of durability, shot feeling and flight distance.

[Production of Golf Ball]

(1) Production of Core

According to the formulations shown in Table 1, the rubber compositions were kneaded with a kneading roll, and heat-pressed in upper and lower molds, each having a hemispherical cavity, at a predetermined temperature for 30 minutes to produce spherical cores having a diameter of 38.6 mm.

TABLE 1-1

| Core formulation No. | | a | b | c | d | e | f | g |
|---|---|---|---|---|---|---|---|---|
| Core Composition (parts by mass) | BR730 | 100 | 100 | 100 | 100 | 100 | 100 | 100 |
| | ZDA | 35.5 | 34.8 | 33.0 | 33.0 | 33.0 | 32.4 | 24.2 |
| | Dicumyl peroxide | 0.8 | 0.8 | 0.8 | 0.8 | 0.8 | 0.8 | 0.8 |
| | Zinc oxide | 5 | 5 | 5 | 5 | 5 | 5 | 5 |
| | BHT | 5 | 5 | 5 | 5 | 5 | 5 | 0.1 |
| | Benzoic acid | 0 | 0 | 0 | 1 | 2 | 0 | 0 |
| | Barium sulfate | *) | *) | *) | *) | *) | *) | *) |

*) An appropriate amount of barium sulfate was added such that the golf ball had a mass of 45.50 g.

TABLE 1-2

| Core formulation No. | | h | i | j | k | l | m | n |
|---|---|---|---|---|---|---|---|---|
| Core Composition (parts by mass) | BR730 | 100 | 100 | 100 | 100 | 100 | 100 | 100 |
| | ZDA | 24.2 | 27.1 | 30.8 | 40.5 | 47.8 | 55.1 | 25.4 |
| | Dicumyl peroxide | 0.8 | 0.8 | 0.8 | 0.8 | 0.8 | 0.8 | 0.8 |
| | Zinc oxide | 5 | 5 | 5 | 5 | 5 | 5 | 5 |
| | BHT | 0.5 | 1 | 3 | 10 | 15 | 20 | 0 |
| | Benzoic acid | 0 | 0 | 0 | 0 | 0 | 0 | 0 |
| | Barium sulfate | *) | *) | *) | *) | *) | *) | *) |

*) An appropriate amount of barium sulfate was added such that the golf ball had a mass of 45.50 g.

The materials used in Table 1 are shown as follows.

BR730: high-cis polybutadiene rubber (cis-1,4 bond amount=95 mass %, 1,2-vinyl bond amount=1.3 mass %, Moony viscosity ($ML_{1+4}$ (100° C.))=55, molecular weight distribution (Mw/Mn)=3) available from JSR Corporation ZDA: zinc acrylate (surface treated with zinc stearate in an amount of 10%) available from Nisshoku Techno Fine Chemical Co., Ltd.

Dicumyl peroxide: available from Tokyo Chemical Industry Co., Ltd. (one-minute half-life temperature: 175.2° C.)

Zinc oxide: WHITE SEAL available from INDOLYSAGHT Co. Ltd.

BHT: dibutylhydroxy toluene available from Tokyo Zairyo Co., Ltd.

Benzoic acid: available from Tokyo Chemical Industry Co., Ltd.

Barium sulfate: "Barium sulfate BD" available from Sakai Chemical Industry Co., Ltd.

(2) Preparation of Cover and Production of Golf Ball

According to the formulations shown in Table 2, the cover materials were extruded with a twin-screw kneading type extruder to prepare the cover compositions in a pellet form. The conditions for extruding the cover compositions were a screw diameter of 45 mm, a screw rotational speed of 200 rpm, and screw L/D=35, and the mixture was heated to 160 to 230° C. at the die position of the extruder. The obtained cover composition was injection molded onto the spherical core obtained above to produce golf balls (diameter: 42.70 mm, mass: 45.50 g) comprising the spherical core and two cover layers covering the core. The first cover layer is an outermost cover layer, and the second cover layer is an inner cover layer adjacent to the outermost cover layer. Evaluation results regarding the obtained golf balls are summarized in Tables 3 to 4.

TABLE 2

| Cover composition No. | | 1 | 2 | 3 | 4 | 5 | 6 |
|---|---|---|---|---|---|---|---|
| Parts by mass | Himilan AM7337 | 26 | 26 | 38.5 | — | — | 50 |
| | Himilan AM7329 | 26 | 40 | 38.5 | 61 | 55 | 50 |
| | Himilan 1555 | — | — | — | 37 | 45 | — |
| | TEFABLOC T3221C | 48 | 34 | 23 | 2 | — | — |
| | Titanium dioxide | 4 | 4 | 4 | 4 | 4 | 4 |
| | JF-90 | 0.2 | 0.2 | 0.2 | 0.2 | 0.2 | 0.2 |
| Slab hardness (Shore D) | | 35 | 45 | 50 | 60 | 63 | 66 |

The materials used in Table 2 are shown as follows.

Himilan AM7337: Na neutralized ionomer available from Du Pont-Mitsui Polychemicals Co., Ltd.

Himilan AM7329: Zn neutralized ionomer available from Du Pont-Mitsui Polychemicals Co., Ltd.

Himilan 1555: Na neutralized ionomer available from Du Pont-Mitsui Polychemicals Co., Ltd.

TEFABLOC T3221C: styrene elastomer available from Mitsubishi Chemical Corporation.

Titanium dioxide: available from Ishihara Sangyo Kaisha, Ltd.

JF-90: light stabilizer available from Johoku Chemical Co., Ltd.

TABLE 3-1

| | Golf ball No. | 1 | 2 | 3 | 4 | 5 |
|---|---|---|---|---|---|---|
| Core | Core formulation | a | b | f | c | c |
| | Vulcanization temperature (° C.) | 170 | 170 | 170 | 160 | 165 |
| | Compression deformation amount (mm) | 3.60 | 3.80 | 4.80 | 4.00 | 4.10 |
| | Core center hardness (Co: Shore C) | 52 | 52 | 52 | 56 | 54 |
| | Core surface hardness (Cs: Shore C) | 72 | 72 | 72 | 68 | 70 |
| | Hardness difference (Cs-Co: Shore C) | 20 | 20 | 20 | 12 | 16 |
| | Core center crosslinking density vo ($\times 10^2$ mol/m$^3$) | 9.3 | 9.3 | 9.3 | 9.3 | 9.3 |
| | Core surface crosslinking density vs ($\times 10^2$ mol/m$^3$) | 16.9 | 16.9 | 16.9 | 16.9 | 16.9 |
| | Crosslinking density difference (vs-vo: $\times 10^2$ mol/m$^3$) | 7.6 | 7.6 | 7.6 | 7.6 | 7.6 |
| Cover | Second cover layer composition No. | 6 | 6 | 6 | 6 | 6 |
| | Second cover layer thickness Ti (mm) | 1.00 | 1.00 | 1.00 | 1.00 | 1.00 |
| | Second cover layer hardness Hi (Shore D) | 66 | 66 | 66 | 66 | 66 |
| | First cover layer composition No. | 4 | 4 | 4 | 4 | 4 |
| | First cover layer thickness To (mm) | 1.05 | 1.05 | 1.05 | 1.05 | 1.05 |
| | First cover layer hardness Ho (Shore D) | 60 | 60 | 60 | 60 | 60 |
| | Average hardness (TixHi + ToxHo)/(Ti + To) | 62.9 | 62.9 | 62.9 | 62.9 | 62.9 |
| Golf ball | Compression deformation amount (mm) | 2.72 | 2.92 | 3.92 | 3.12 | 3.22 |
| | Durability | E | E | F | F | G |
| | Shot feeling | P | G | E | E | E |
| | Flight distance | F | G | E | F | G |
| | Comprehensive evaluation | C | A | B | C | A |

TABLE 3-2

| | Golf ball No. | 6 | 7 | 8 | 9 | 10 |
|---|---|---|---|---|---|---|
| Core | Core formulation | d | e | g | h | i |
| | Vulcanization temperature (° C.) | 170 | 170 | 170 | 170 | 170 |
| | Compression deformation amount (mm) | 4.30 | 4.40 | 4.20 | 4.20 | 4.20 |
| | Core center hardness (Co: Shore C) | 48 | 47 | 53 | 53 | 55 |
| | Core surface hardness (Cs: Shore C) | 76 | 78 | 72 | 72 | 72 |
| | Hardness difference (Cs-Co: Shore C) | 28 | 31 | 19 | 19 | 17 |
| | Core center crosslinking density vo ($\times 10^2$ mol/m$^3$) | 9.3 | 9.3 | 9.4 | 9.4 | 9.3 |
| | Core surface crosslinking density vs ($\times 10^2$ mol/m$^3$) | 16.9 | 16.9 | 23.2 | 23.2 | 18.1 |
| | Crosslinking density difference (vs-vo: $\times 10^2$ mol/m$^3$) | 7.6 | 7.6 | 13.8 | 13.8 | 8.8 |
| Cover | Second cover layer composition No. | 6 | 6 | 6 | 6 | 6 |
| | Second cover layer thickness Ti (mm) | 1.00 | 1.00 | 1.00 | 1.00 | 1.00 |
| | Second cover layer hardness Hi (Shore D) | 66 | 66 | 66 | 66 | 66 |
| | First cover layer composition No. | 4 | 4 | 4 | 4 | 4 |
| | First cover layer thickness To (mm) | 1.05 | 1.05 | 1.05 | 1.05 | 1.05 |
| | First cover layer hardness Ho (Shore D) | 60 | 60 | 60 | 60 | 60 |
| | Average hardness (TixHi + ToxHo)/(Ti + To) | 62.9 | 62.9 | 62.9 | 62.9 | 62.9 |
| Golf ball | Compression deformation amount (mm) | 3.42 | 3.52 | 3.32 | 3.32 | 3.32 |
| | Durability | E | E | F | F | G |
| | Shot feeling | G | F | F | F | G |
| | Flight distance | G | F | E | E | E |
| | Comprehensive evaluation | A | C | C | C | A |

TABLE 4-1

| | Golf ball No | 11 | 12 | 13 | 14 | 15 | 16 |
|---|---|---|---|---|---|---|---|
| Core | Core formulation | j | c | k | l | m | n |
| | Vulcanization temperature (° C.) | 170 | 170 | 170 | 170 | 170 | 170 |
| | Compression deformation amount (mm) | 4.20 | 4.20 | 4.20 | 4.20 | 4.20 | 4.20 |
| | Core center hardness (Co: Shore C) | 54 | 52 | 49 | 49 | 49 | 53 |
| | Core surface hardness (Cs: Shore C) | 72 | 72 | 70 | 66 | 62 | 72 |
| | Hardness difference (Cs-Co: Shore C) | 18 | 20 | 21 | 17 | 13 | 19 |
| | Core center crosslinking density vo ($\times 10^2$ mol/m$^3$) | 9.3 | 9.3 | 9.3 | 9.3 | 9.3 | 9.3 |
| | Core surface crosslinking density vs ($\times 10^2$ mol/m$^3$) | 18.0 | 16.9 | 13.0 | 12.0 | 10.0 | 23.2 |
| | Crosslinking density difference (vs-vo: $\times 10^2$ mol/m$^3$) | 8.7 | 7.6 | 3.7 | 2.7 | 0.7 | 13.9 |
| Cover | Second cover layer composition No. | 6 | 6 | 6 | 6 | 6 | 6 |
| | Second cover layer thickness Ti (mm) | 1.00 | 1.00 | 1.00 | 1.00 | 1.00 | 1.00 |
| | Second cover layer hardness Hi (Shore D) | 66 | 66 | 66 | 66 | 66 | 66 |

TABLE 4-1-continued

|  | Golf ball No | 11 | 12 | 13 | 14 | 15 | 16 |
|---|---|---|---|---|---|---|---|
|  | First cover layer composition No. | 4 | 4 | 4 | 4 | 4 | 4 |
|  | First cover layer thickness To (mm) | 1.05 | 1.05 | 1.05 | 1.05 | 1.05 | 1.05 |
|  | First cover layer hardness Ho (Shore D) | 60 | 60 | 60 | 60 | 60 | 60 |
|  | Average hardness (Ti×Hi + To×Ho)/(Ti + To) | 62.9 | 62.9 | 62.9 | 62.9 | 62.9 | 62.9 |
| Golf | Compression deformation amount (mm) | 3.32 | 3.32 | 3.32 | 3.32 | 3.32 | 3.32 |
| ball | Durability | E | E | E | G | P | F |
|  | Shot feeling | E | E | G | F | F | F |
|  | Flight distance | E | E | E | E | E | E |
|  | Comprehensive evaluation | A | A | A | B | C | C |

TABLE 4-2

|  | Golf ball No | 17 | 18 | 19 | 20 | 21 |
|---|---|---|---|---|---|---|
| Core | Core formulation | c | c | c | c | c |
|  | Vulcanization temperature (° C.) | 170 | 170 | 170 | 170 | 170 |
|  | Compression deformation amount (mm) | 4.20 | 4.20 | 4.20 | 4.20 | 4.20 |
|  | Core center hardness (Co: Shore C) | 52 | 52 | 52 | 52 | 52 |
|  | Core surface hardness (Cs: Shore C) | 72 | 72 | 72 | 72 | 72 |
|  | Hardness difference (Cs-Co: Shore C) | 20 | 20 | 20 | 20 | 20 |
|  | Core center crosslinking density vo (×10² mol/m³) | 9.3 | 9.3 | 9.3 | 9.3 | 9.3 |
|  | Core surface crosslinking density vs (×10² mol/m³) | 16.9 | 16.9 | 16.9 | 16.9 | 16.9 |
|  | Crosslinking density difference (vs-vo: ×10² mol/m³) | 7.6 | 7.6 | 7.6 | 7.6 | 7.6 |
| Cover | Second cover layer composition No. | 6 | 6 | 6 | 6 | 3 |
|  | Second cover layer thickness Ti (mm) | 1.00 | 1.00 | 1.00 | 1.00 | 1.00 |
|  | Second cover layer hardness Hi (Shore D) | 66 | 66 | 66 | 66 | 50 |
|  | First cover layer composition No. | 1 | 2 | 3 | 5 | 5 |
|  | First cover layer thickness To (mm) | 1.05 | 1.05 | 1.05 | 1.05 | 1.05 |
|  | First cover layer hardness Ho (Shore D) | 35 | 45 | 50 | 63 | 63 |
|  | Average hardness (Ti×Hi + To×Ho)/(Ti + To) | 50.1 | 55.2 | 57.8 | 64.5 | 56.7 |
| Golf | Compression deformation amount (mm) | 3.48 | 3.43 | 3.38 | 3.30 | 3.69 |
| ball | Durability | E | E | E | G | F |
|  | Shot feeling | E | E | E | G | G |
|  | Flight distance | P | F | G | E | E |
|  | Comprehensive evaluation | C | B | A | A | B |

It can be seen from Tables 3 and 4 that the golf ball according to the present disclosure has excellent durability and great flight distance and good shot feeling for an average golfer with a slow head speed.

The present disclosure is suitably used as a golf ball.

The present disclosure (1) is a golf ball comprising a spherical core and at least two cover layers covering the spherical core, wherein the spherical core is formed from a core rubber composition containing (a) a base rubber, (b) an α,β-unsaturated carboxylic acid and/or a metal salt thereof as a co-crosslinking agent, and (c) a crosslinking initiator, a difference (core surface crosslinking density–core center crosslinking density) between a surface crosslinking density of the spherical core and a center crosslinking density of the spherical core is more than $1.0 \times 10^2$ mol/m³ and less than $9.0 \times 10^2$ mol/m³, a hardness difference (Cs-Co) between a surface hardness Cs (Shore C hardness) of the spherical core and a center hardness Co (Shore C hardness) of the spherical core is 13.0 or more and 30.0 or less, a compression deformation amount of the spherical core when applying a load from an initial load of 98 N to a final load of 1275 N to the spherical core is 3.8 mm or more, and the at least two cover layers include a first cover layer and a second cover layer positioned closer to the spherical core than the first cover layer, an average hardness Dave=(Ti×Hi+To×Ho)/(Ti+To) of the first cover layer and the second cover layer is 55 or more, where To (mm) is a thickness of the first cover layer, Ho (Shore D) is a slab hardness of the first cover layer, Ti (mm) is a thickness of the second cover layer, and Hi (Shore D) is a slab hardness of the second cover layer.

The present disclosure (2) is the golf ball according to the present disclosure (1), wherein the slab hardness Hi of the second cover layer is higher than the slab hardness Ho of the first cover layer.

The present disclosure (3) is the golf ball according to the present disclosure (1) or (2), wherein the cover has a total thickness in a range from 1.0 mm to 3.0 mm.

The present disclosure (4) is the golf ball according to any one of the present disclosures (1) to (3), wherein the surface crosslinking density of the spherical core is $9.0 \times 10^2$ mo/m³ or more and $22.0 \times 10^2$ mo/m³ or less.

The present disclosure (5) is the golf ball according to any one of the present disclosures (1) to (4), wherein the center crosslinking density of the spherical core is $4.0 \times 10^2$ mol/m³ or more and $13.0 \times 10^2$ mol/m³ or less.

The present disclosure (6) is the golf ball according to any one of the present disclosures (1) to (5), wherein the surface hardness Cs of the spherical core is 60.0 or more and 90.0 or less in Shore C hardness.

The present disclosure (7) is the golf ball according to any one of the present disclosures (1) to (6), wherein the center hardness Co of the spherical core is 30.0 or more and 70.0 or less in Shore C hardness.

The present disclosure (8) is the golf ball according to any one of the present disclosures (1) to (7), wherein the core rubber composition contains at least one (d) additive selected from the group consisting of (d1) a hindered phenol-based compound and (d2) a hindered amine-based compound.

The present disclosure (9) is the golf ball according to any one of the present disclosures (1) to (8), wherein the core rubber composition contains (d1) a hindered phenol-based compound and/or (d2) a hindered amine-based compound in an amount ranging from 0.5 part by mass to 15 parts by mass with respect to 100 parts by mass of (a) the base rubber.

The present disclosure (10) is the golf ball according to the present disclosure (8) or (9), wherein (d1) the hindered phenol-based compound is at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol), 2,6-di-tert-butyl-4-({2-[(3,5-di-tert-butyl-4-hydroxyphenyl) sulfanyl]propane-2-yl} sulfanyl) phenol, 1,3,5-tris(3,5-di-tert-butyl-4-hydroxybenzyl)-1,3,5-triazine-2,4,6-(1H,3H,5H)-trione, and pentaerythritol tetrakis[3-(3,5-di-tert-butyl-4-hydroxyphenyl) propionate.

The present disclosure (11) is the golf ball according to any one of the present disclosures (1) to (10), wherein the first cover layer is an outermost cover layer, and the second cover layer is an inner cover layer adjacent to the outermost cover layer.

This application is based on Japanese Patent application No. 2021-153490 filed on Sep. 21, 2021, the content of which is hereby incorporated by reference.

The invention claimed is:

1. A golf ball comprising a spherical core and at least two cover layers covering the spherical core, wherein
the spherical core is formed from a core rubber composition containing (a) a base rubber, (b) an α,β-unsaturated carboxylic acid and/or a metal salt thereof as a co-crosslinking agent, and (c) a crosslinking initiator,
a difference (core surface crosslinking density-core center crosslinking density) between a surface crosslinking density of the spherical core and a center crosslinking density of the spherical core is more than $1.0 \times 10^2$ mol/m$^3$ and $7.6 \times 10^2$ mol/m$^3$ or less,
a hardness difference (Cs-Co) between a surface hardness Cs (Shore C hardness) of the spherical core and a center hardness Co (Shore C hardness) of the spherical core is 13.0 or more and 30.0 or less,
a compression deformation amount of the spherical core when applying a load from an initial load of 98 N to a final load of 1275 N to the spherical core is 3.8 mm or more, and
the at least two cover layers include a first cover layer and a second cover layer positioned closer to the spherical core than the first cover layer,
an average hardness Dave=(Ti×Hi+To×Ho)/(Ti+To) of the first cover layer and the second cover layer is 55 or more, where To (mm) is a thickness of the first cover layer, Ho (Shore D) is a slab hardness of the first cover layer, Ti (mm) is a thickness of the second cover layer, and Hi (Shore D) is a slab hardness of the second cover layer.

2. The golf ball according to claim 1, wherein the slab hardness Hi of the second cover layer is higher than the slab hardness Ho of the first cover layer.

3. The golf ball according to claim 2, wherein a hardness difference (Hi-Ho) between the slab hardness Hi of the second cover layer and the slab hardness Ho of the first cover layer is 2 or more and 30 or less in Shore D hardness.

4. The golf ball according to claim 1, wherein the cover has a total thickness in a range from 1.0 mm to 3.0 mm.

5. The golf ball according to claim 1, wherein the surface crosslinking density of the spherical core is $9.0 \times 10^2$ mol/m$^3$ or more and $22.0 \times 10^2$ mol/m$^3$ or less.

6. The golf ball according to claim 1, wherein the center crosslinking density of the spherical core is $4.0 \times 10^2$ mol/m$^3$ or more and $13.0 \times 10^2$ mol/m$^3$ or less.

7. The golf ball according to claim 1, wherein the surface hardness Cs of the spherical core is 60.0 or more and 90.0 or less in Shore C hardness.

8. The golf ball according to claim 1, wherein the center hardness Co of the spherical core is 30.0 or more and 70.0 or less in Shore C hardness.

9. The golf ball according to claim 1, wherein the core rubber composition contains at least one (d) additive selected from the group consisting of (d1) a hindered phenol-based compound and (d2) a hindered amine-based compound.

10. The golf ball according to claim 9, wherein (d1) the hindered phenol-based compound includes at least one compound selected from the group consisting of dibutylhydroxy toluene, octadecyl-3-(3,5-di-tert-butyl-4-hydroxyphenyl) propionate, 4,4'-methylene bis(2,6-di-tert-butylphenol),
2,6-di-tert-butyl-4-({2-[(3,5-di-tert-butyl-4-hydroxyphenyl) sulfanyl]propane-2-yl} sulfanyl) phenol,
1,3,5-tris(3,5-di-tert-butyl-4-hydroxybenzyl)-1,3,5-triazine-2,4,6-(1H,3H, 5H)-trione, and
pentaerythritol tetrakis[3-(3,5-di-tert-butyl-4-hydroxyphenyl) propionate.

11. The golf ball according to claim 1, wherein the core rubber composition contains (d1) a hindered phenol-based compound and/or (d2) a hindered amine-based compound in an amount ranging from 0.5 part by mass to 15 parts by mass with respect to 100 parts by mass of (a) the base rubber.

12. The golf ball according to claim 1, wherein the first cover layer is an outermost cover layer, and the second cover layer is an inner cover layer adjacent to the outermost cover layer.

13. The golf ball according to claim 1, wherein the average hardness Dave of the first cover layer and the second cover layer is 55 or more and 71 or less.

14. The golf ball according to claim 1, wherein the slab hardness Ho of the first cover layer is 32 or more and 72 or less in Shore D hardness, and the slab hardness Hi of the second cover layer is 32 or more and 72 or less in Shore D hardness.

15. The golf ball according to claim 1, wherein the compression deformation amount of the spherical core is 3.8 mm or more and 4.3 mm or less.

16. The golf ball according to claim 1, wherein the thickness To of the first cover layer is 0.3 mm or more and 2.7 mm or less, and the thickness Ti of the second cover layer is 0.3 mm or more and 2.7 mm or less.

17. The golf ball according to claim 1, wherein the core rubber composition contains (d1) a hindered phenol-based compound and/or (d2) a hindered amine-based compound in an amount ranging from 10 parts by mass to 15 parts by mass with respect to 100 parts by mass of (a) the base rubber.

18. The golf ball according to claim 1, wherein the core rubber composition contains at least one (d) additive selected from the group consisting of (d1) a hindered phenol-based compound and (d2) a hindered amine-based compound, and contains (c) the crosslinking initiator in an amount ranging from 0.2 part by mass to 5.0 parts by mass with respect to 100 parts by mass of (a) the base rubber.

19. The golf ball according to claim 1, wherein the core rubber composition neither contains (d1) a hindered phenol-based compound nor (d2) a hindered amine-based compound, and contains (c) the crosslinking initiator in an amount of 0.1 part by mass or less with respect to 100 parts by mass of (a) the base rubber.

20. The golf ball according to claim 1, wherein the core rubber composition consists of:
  (a) the base rubber,
  (b) the α,β-unsaturated carboxylic acid and/or the metal salt thereof as the co-crosslinking agent,
  (c) the crosslinking initiator, and
  at least one optional component selected from the group consisting of
  (d1) a hindered phenol-based compound,
  (d2) a hindered amine-based compound,
  (e) an organic sulfur compound,
  (f) a metal compound selected from a metal hydroxide, a metal oxide and a metal carbonate,
  a pigment,
  a filler for adjusting weight,
  a peptizing agent, and
  a softener.

* * * * *